United States Patent [19]
Nelson

[11] 3,856,192
[45] Dec. 24, 1974

[54] STEREO TAPE CARTRIDGE RACK

[76] Inventor: Charles R. Nelson, RD No. 1, Box 128, Duanesburg, N.Y. 12056

[22] Filed: June 18, 1973

[21] Appl. No.: 371,182

[52] U.S. Cl.... 224/42.1 C, 296/37 R, 224/42.42 R, 224/42.46 R, 312/10
[51] Int. Cl............................................. B60r 9/00
[58] Field of Search............ 224/294, 42.1 C, 42 G, 224/42.42 R; 296/37 R; 206/19.5, DIG. 36; 312/10; 211/13, 71, 86, 88, 90, 126, 40

[56] References Cited
UNITED STATES PATENTS

| | | | |
|---|---|---|---|
| 2,301,730 | 11/1942 | Mann | 296/37 R |
| 2,568,046 | 9/1951 | Wilkinson | 224/42.42 R |
| 3,371,976 | 3/1968 | Ritz | 206/DIG. 36 |
| 3,378,146 | 4/1968 | Dyess | 224/48 R |
| 3,385,643 | 5/1968 | Adell | 312/10 |
| 3,510,008 | 5/1970 | Mason | 206/DIG. 36 |
| 3,666,337 | 5/1972 | Sztorc | 206/DIG. 36 |
| 3,677,396 | 7/1972 | Staar | 312/10 |

Primary Examiner—Robert J. Spar
Assistant Examiner—R. B. Johnson
Attorney, Agent, or Firm—Walter F. Wessendorf, Jr.

[57] ABSTRACT

Discloses a stereo tape cartridge rack comprising two sub-assemblies adjustably joined together and adjustably fixed and carried by the vehicle's upper front window mouldings by mounting brackets for mounting the rack above the vehicle's windshield header. The rack sub-assemblies have compartments for storing the stereo tape cartridges defined by bottom walls, lateral sidewalls, intermediate walls, rear walls, middle ribs, middle and top divider strips, covered with felt padding to guide the insertion of the tape cartridges, to releasably retain the emplaced cartridges and to prevent their rattling. Half the cartridge storage compartments are canted relative to the remaining cartridge storage compartments to present a wider open mouth end to thereby facilitate grasping and removal of the cartridges, and their return and replacement. Also discloses sun visor sub-assemblies mounted by the rack bottom walls.

5 Claims, 6 Drawing Figures

STEREO TAPE CARTRIDGE RACK

This invention relates to a stereo tape cartridge rack having laterally disposed mounting brackets carried by the inside upper front window mouldings for emplacement of the rack above a vehicle's windshield header.

Stereo tape cartridge racks for vehicles conventionally are mounted relative to the center of the lower edge of the instrument panel or dashboard. Such a mounting location in and of itself presents problems for a driver while operating his vehicle. To select and remove a stereo tape cartridge from the rack while operating his vehicle, the driver most rotate the upper part of his body to the right, as well as reach with his right hand forward and under the instrument panel. In performing this physical movement, not only is the driver's visual attention diverted from the road and traffic conditions then and there existing on the highway, but also the driver's physical control of the steering wheel and gas pedal is substantially impaired. Furthermore, should the driver have to apply the vehicle's brakes in an emergency situation arising while selecting and removing a stereo tape cardridge from the rack, it is difficult physically for the driver to recover and resume his normal driving position to safely apply the vehicle's brakes. For a six-foot driver, the upper part of the instrument panel will partially block his view of the road while physically selecting, reaching for and removing a stereo tape cartridge from the rack. For a woman of average height, the upper part of the instrument panel will fully block her view of the road while physically selecting, reaching for and removing a stereo tape cartridge from the rack. Accordingly, safety dictates that the rack be located elsewhere other than beneath the instrument panel. An object of this invention is to contribute to the solution of this discussed problem of the art by providing a stereo tape cartridge rack that is located above the vehicle's windshield header.

Conventional racks hold anywhere from 4 to 10 stereo tape cartridges thereby limiting the choice and selection of music that can be played in the tape deck. Contrastingly, the stereo tape cartridge rack of this invention holds 20 stereo type cartridges to thereby provide a greater and wider choice and selection of music that can be played in the tape deck.

Conventional racks are constructed to hold the stereo tape cartridges in simple-stack, parallel arrangement thereby rendering it difficult to physically grasp and remove a selected stereo tape cartridge. Constrastingly, the rack of this invention is constructed to receive the stereo tape cartridges in multiple stacks with only two stereo tape cartridges in each stack. Of further structural significance is the fact that the two stereo tape cartridges in each stack are not disposed in parallel arrangement but rather are canted relative to each other to prevent a wider open mouth end to thereby facilitate grasping and removal of a selected stereo tape cartridge as well as to facilitate its return and replacement in its compartment.

The stereo tape cartridge rack of this invention structurally incorporates felt padding to engage the lateral sides, top, bottom and rear of each emplaced stereo tape cartridge to guide insertion of the stereo tape cartridge into its compartment, to releasably retain the stereo tape cartridge so emplaced and to prevent the emplaced stereo tape cartridge from rattling.

These objects and other objects of the invention should be discerned and appreciated from the detailed specification taken in conjunction with the drawings wherein like reference numerals refer to similar parts throughout the several views, in which.

Figure 1:
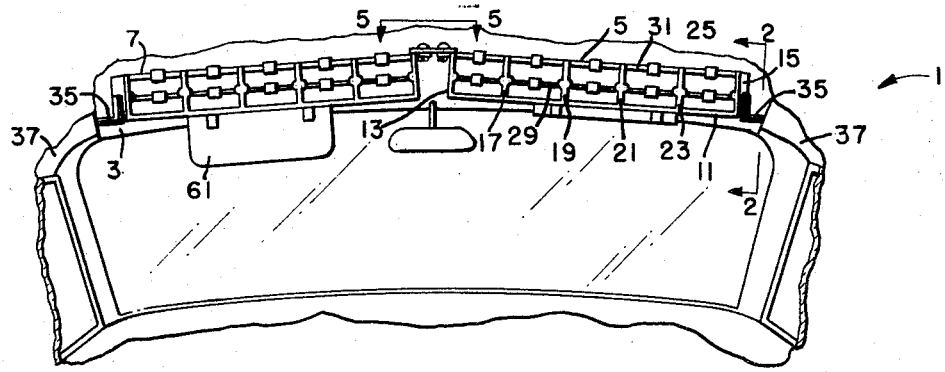
FIG. 1 is a view of the invention showing same emplaced and mounted in the vehicle.

To facilitate the understanding of the invention, a nomenclature list is hereby provided:

NOMENCLATURE 1 generally refers to stereo tape cartridge rack invention
3 windshield header
5 rack sub-assembly
7 rack sub-assembly
9 stereo tape cartridge
11 bottom wall
13 inner lateral side wall
15 outer lateral side wall
17 intermediate wall
19 intermediate wall
21 intermediate wall
23 intermediate wall
25 rear wall
27 middle rib
29 middle divider strip
31 top divider strip
33 felt padding
35 L-shaped mounting bracket
37 inside upper front window moulding
39 leg of L-shaped mounting bracket 35
41 elongated slot of leg 39
43 threaded stud
45 nut
47 flange of inner lateral side wall 13
49 hole of flange 47
51 elongated slot of flange 47
53 flange plate
55 elongated slot of flange plate 53
57 screw
59 nut
61 sun visor sub-assembly In FIG. 1 of the drawings, reference numeral 1 generally refers to the stereo tape cartridge rack of this invention shown mounted and emplaced above the vehicle's windshield header 3. Rack 1 has two similarly constructed sub-assemblies 5 and 7. Unless otherwise noted, the description of the invention will be afforded with reference to rack sub-assembly 5.

As shown, rack sub-assembly 5 has five stacks of two storage compartments each for a total of ten compartments for receiving in emplaced relationship therewith stereo tape cartridges 9. The compartments are formed by the horizontally disposed bottom wall 11, upstanding vertically disposed inner and outer lateral side walls 13 and 15, respectively, upstanding vertically disposed intermediate walls 17, 19, 21 and 23, rear wall 25, middle ribs 27, horizontally disposed middle divider strips 29 and horizontally disposed top divider strips 31, as shown.

Figure 2:
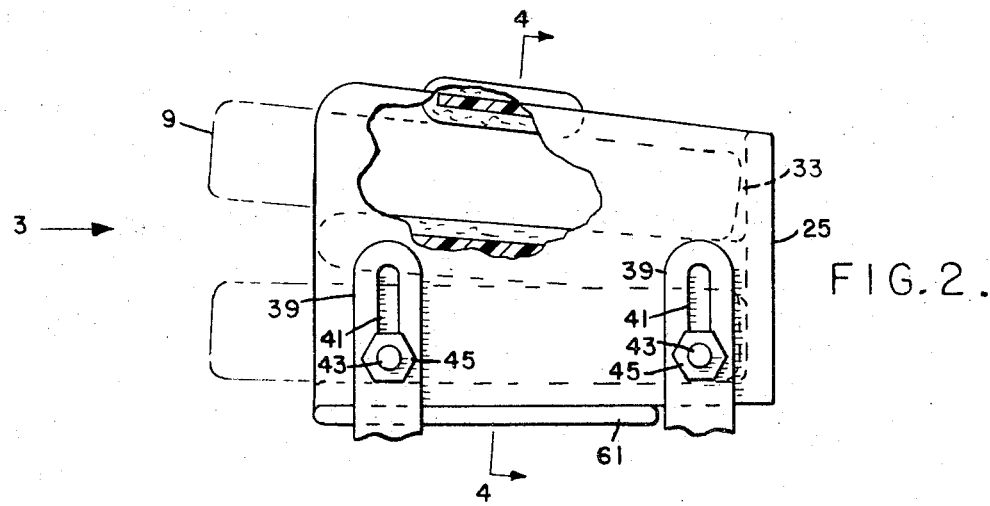
FIG. 2 is a view taken in the direction of the arrows 2 — 2 in FIG. 1.
Figure 3:
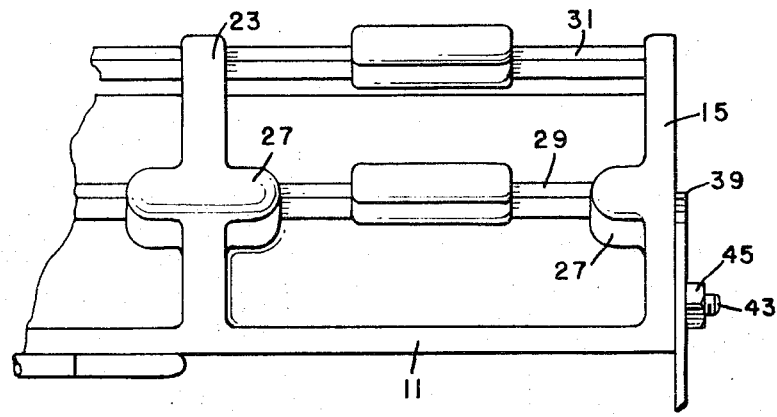
FIG. 3 is a view taken in the direction of the arrow 3 in FIG. 2.
Figure 4:
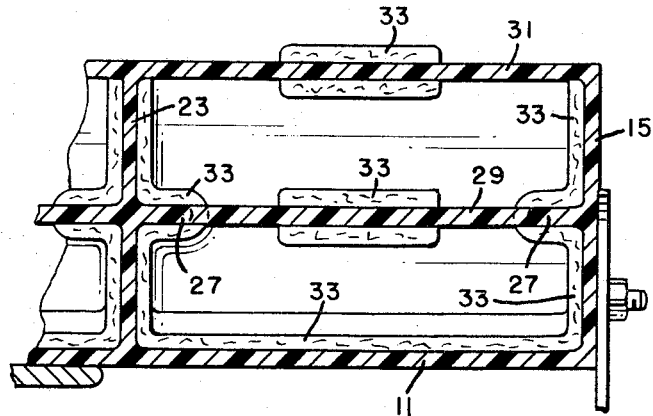
FIG. 4 is a sectional view taken in the direction of the arrows 4 — 4 in FIG. 2.

Middle ribs 27 extend outwardly from and in transverse relationship relative to walls 13, 15, 17, 19, 21 and 23, and are canted relative to bottom wall 11, as is shown more discernably in FIGS. 2 and 3. Middle divider strips join middle ribs 27, these middle divider strips 29 are coplanar with middle ribs 27 and are correspondingly canted. Top divider strips 31, parallel with the middle divider strips 29, join the top portions of walls 13, 15, 17, 19, 21 and 23, as shown.

Accordingly, the stereo tape cartridges 9, shown in FIG. 2 as being received in emplaced relationship in their respective compartments, are correspondingly canted relative to each other to thereby present a wider open mouth end to facilitate grasping and removal of either of the stereo tape cartridges 9, as well as return and replacement of same.

The upper portion of bottom wall 11, inside portions of lateral side walls 13 and 15, both sides of intermediate walls 17, 19, 21 and 23, inside portion of rear wall 25 and middle ribs 27 are all covered with felt 33 or other suitable padding material, as shown. The mid portions of middle divider strips 29 and top divider strips 31 are covered with the felt padding material 33, as shown. This felt padding material 33 along with the described structure that it covers functions to guide the insertion of the stereo tape cartridges 9 into each of their respective compartments by engaging the lateral sides, top, bottom and rear of each of the stereo tape cartridges 9 inserted. The portions of the felt padding material 33 engaged by the inserted stereo tape cartridge 9 are thereby compressed by such engagement and, as such, the felt padding material 33 thusly compressed further functions to releasably retain the emplaced stereo tape cartridge 9 and to prevent its rattling.

Rack 1 is mounted above the vehicle's windshield header 3 by means of lateral, L-shaped mounting brackets 35 adjustably carried by the lateral side walls 15 of sub-assemblies 5 and 7, and which mounting brackets 35 are suitably fixed to and carried by the inside upper front window mouldings 37.

Legs 39 of L-shaped mounting brackets 35 have elongated slots 41 formed therethrough. Threaded studs 43, carried by the outer lateral side walls 15, extend outwardly therefrom, these threaded studs 43 are received within the elongated slots 41 of the L-shaped mounting bracket legs 39 and are engaged by nuts 45, thereby permitting adjustable disposition of the outer lateral side walls 15 in a vertical direction.

The inner lateral side walls 13 of sub-assemblies 5 and 7 have flanges 47 which extend normal to and outward from the top portions of inner lateral side walls 13, as shown. Each flange 47 has a hole 49 and an elongated slot 51 formed therethrough, as shown. Flange plate 53 has elongated slots 55 formed therethrough, as shown. Screws 57, disposed through the elongated slots 55 of flange plate 53 and the associated holes 49 and elongated slots 51 of flanges 47, are suitably engaged by nuts 59 to provide securement, as shown.

Figure 5:
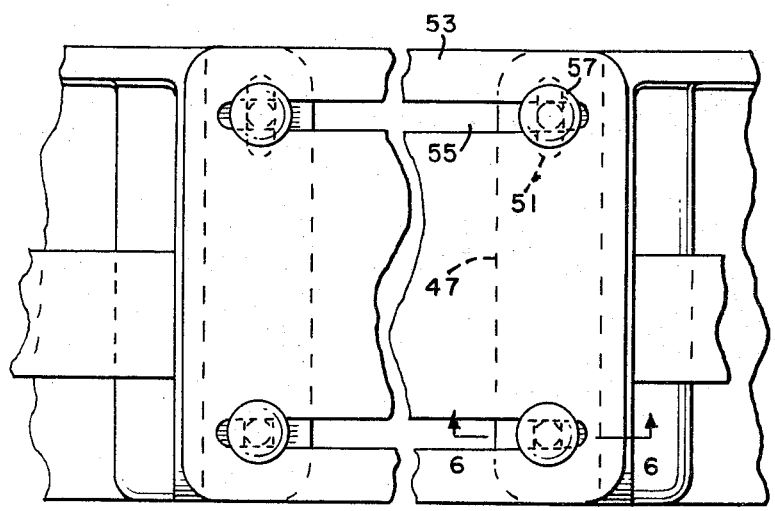
FIG. 5 is a view taken in the direction of the arrows 5 — 5 in FIG. 1.
Figure 6:
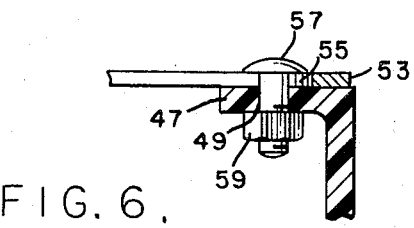
FIG. 6 is a sectional view taken in the direction of the arrows 6 — 6 in FIG. 5.

Since the windshield header 3 is bowed outwardly, the described structure of the flanges 47 and flange plate 53 with their operatively engaged securing screws 57 and nuts 59 permits sub-assemblies 5 and 7 not only to be joined together, but also to be bowed outwardly to correspond to the outwardly bowed windshield header 3 by means of each screw 57 disposed in flange elongated slot 51 being pivoted in flange elongated slot 51 relative to its associated screw 57 disposed in flange hole 49, as shown more discernably in FIGS. 5 and 6.

The elongated slots 55 of flange plate 53 further permit the interior spatial width of the vehicle, above whose windshield header 3 the rack is to be mounted, to be accommodated by correspondingly shortening or increasing the spatial width of rack 1.

The bottom walls 11 of sub-assemblies 5 and 7 can further be utilized to suitably mount sun visor sub-assemblies 61, as shown in FIGS. 1 and 2.

In utilizing rack 1, the driver can emplace, in any desired order, in rack sub-assembly 3 the stereo tape cartridges 9 he wishes to play in his tape deck. From the foregoing description of the invention, it should be discerned and appreciated that the driver need merely reach with his hand not only to grasp and remove the selected stereo tape cartridge to be played in the tape deck, but also to replace same in its compartment. The driver's required physical movement does not divert his attention from the highway, nor impair his physical control of the vehicle's steering wheel. The ten stereo tape cartridges 9 that can be stored in the compartments of sub-assembly 5 not only provide a wider choice and selection of music that can be played in the tape deck; but also, on a long trip and after the stereo tape cartridges 9 stored in the compartments of sub-assembly 3 have been played, the driver can stop for a break and transfer the stereo tape cartridges 9 from sub-assembly 5 to subassembly 3 and resume his trip.

Having thusly described my invention, I claim:

1. A stereo tape cartridge rack for mounting above a vehicle's windshield header, said stereo tape cartridge rack comprising sub-assemblies having bottom walls, inner and outer lateral side walls, intermediate walls, rear walls, middle ribs, middle divider strips and top divider strips defining compartments for storing stereo tape cartridges, said bottom walls being horizontally disposed, said lateral side walls being vertically upstanding from said bottom walls, said intermediate walls being vertically upstanding from said bottom walls and being between said lateral side walls, said middle ribs extending outwardly from said lateral side and intermediate walls and in transverse relationship thereto, said middle divider strips joining said middle ribs and said top divider strips joining the top portions of said lateral side walls and intermediate walls, said middle ribs being canted relative to said bottom walls, wherein said middle divider strips are coplanar with said middle ribs and wherein said top divider strips are parallel with said middle divider strips such that half said stereo tape cartridges emplaced in the storage compartments are correspondingly canted relative to the remaining emplaced stereo tape cartridges to present a wider open mouth end to facilitate grasping and removal of the stereo tape cartridges, and return and replacement of same in the storage compartments, the upper portions of said bottom walls, the inside portions of said lateral side walls, both sides of said intermediate walls, the inside portions of said rear walls, said middle ribs and the midportions of said middle divider strips and top divider strips includes means with compressible portions to guide the insertion of a stereo tape cartridge into its respective compartment by engaging the lateral sides, top, bottom and rear of the stereo tape cartridge with the thusly compressed portions of said means functioning to releasably retain the emplaced stereo tape cartridge and to prevent its rattling, said rack including mounting brackets, wherein said outer lateral side walls adjustably carry said mounting brackets and wherein said mounting brackets are adapted to be suitably fixed to and carried by the vehicle's inside upper front window mouldings.

2. A stereo tape cartridge rack in accordance with claim 1, wherein said mounting brackets are L-shaped having legs having elongated slots, wherein said outer lateral side walls have threaded studs extending outwardly therefrom, wherein said elongated slots of said mounting bracket legs receive therethrough said threaded studs engaged by nuts for securement and wherein said threaded studs are movable within said elongated slots of said L-shaped mounting bracket legs to permit adjustable disposition of said outer lateral side walls in a vertical direction.

3. A stereo tape cartridge rack in accordance with claim 1, wherein said inner lateral side walls have flanges extending from their top portions, wherein said flanges have holes and elongated slots, wherein said rack has a flange plate having elongated slots, wherein screws are disposed through said flange holes, said flange elongated slots and said flange plate elongated slots, and are engaged by nuts for securement to join together said rack sub-assemblies, to adjustably bow said rack sub-assemblies outwardly to correspond to the outward bowing of the windshield header, and to adjustably increase or decrease the width of said rack to accommodate the spatial necessity of the width of the vehicle above the vehicle's windshield header.

4. A stereo tape cartridge rack in accordance with claim 1, wherein said rack has sun visor sub-assemblies and wherein said bottom walls mount said sun visor sub-assemblies.

5. A stereo tape cartridge rack for mounting above a vehicle's windshield header, said stereo tape cartridge rack comprising sub-assemblies having bottom walls, inner and outer lateral side walls, intermediate walls, rear walls, middle ribs, middle divider strips and top divider strips defining compartments for storing stereo tape cartridges, said bottom walls being horizontally disposed, said lateral side walls being vertically upstanding from said bottom walls, said intermediate walls being vertically upstanding from said bottom walls and being between said lateral side walls, said middle ribs extending outwardly from said lateral side and intermediate walls and in transverse relationship thereto, said middle divider strips joining said middle ribs and said top divider strips joining the top portions of said lateral side walls and intermediate walls, said middle ribs are canted relative to said bottom walls, wherein said middle divider strips are coplanar with said middle ribs and wherein said top divider strips are parallel with said middle divider strips such that half of said stereo tape cartridges emplaced in the storage compartments are correspondingly canted relative to the remaining emplaced stereo tape cartridges to present a wider open mouth end to facilitate grasping and removal of the stereo tape cartridges, and return and replacement of same in the storage compartments; wherein the upper portions of said bottom walls, the inside portions of said lateral side walls, both sides of said intermediate walls, the inside portions of said rear walls, said middle ribs and the mid portions of said middle divider strips and top divider strips are covered with padding material to guide the insertion of a stereo tape cartridge into its respective compartment by engaging the lateral sides, top, bottom and rear of the stereo tape cartridge with the thusly compressed portions of said padding material functioning to releasably retain the emplaced stereo tape cartridge and to prevent its rattling; wherein said rack has L-shaped mounting brackets having legs having elongated slots, wherein said L-shaped mounting brackets are adapted to be suitably fixed to and carried by the vehicle's inside upper front window mouldings, wherein said outer lateral side walls have threaded studs extending outwardly therefrom, wherein said elongated slots of said mounting bracket legs receive therethrough said threaded studs engaged by nuts for securement and wherein said threaded studs are movable within said elongated slots of said L-shaped mounting bracket legs to permit adjustable disposition of said outer lateral side walls in a vertical direction; and wherein said inner lateral side walls have flanges extending from their top portions, wherein said flanges have holes and elongated slots, wherein said rack has a flange plate having elongaged slots, wherein screws are disposed through said flange holes, said flange elongated slots and said flange plate elongated slots, and are engaged by nuts for securement to join together said rack sub-assemblies, to adjustably bow said rack sub-assemblies outwardly to correspond to the outward bowing of the windshield header, and to adjustably increase or decrease the width of said rack to accommodate the spatial necessity of the width of the vehicle above the vehicle's windshield header.

* * * * *